(12) United States Patent
Svec et al.

(10) Patent No.: US 6,241,795 B1
(45) Date of Patent: Jun. 5, 2001

(54) SOLUBLE FERTILIZER FORMULATION

(75) Inventors: Charles H. Svec, Hanover; Akshay Vidyarthi, Abbottstown, both of PA (US)

(73) Assignee: Miller Chemical and Fertilizer Corporation, Hanover, PA (US)

( * ) Notice: Subject to any disclaimer, the term of this patent is extended or adjusted under 35 U.S.C. 154(b) by 0 days.

(21) Appl. No.: 09/526,901

(22) Filed: Mar. 16, 2000

Related U.S. Application Data

(60) Provisional application No. 60/129,902, filed on Apr. 16, 1999.

(51) Int. Cl.$^7$ ................ C05C 9/00; C05F 11/00
(52) U.S. Cl. ................ 71/11; 71/29; 71/30; 71/32; 71/34
(58) Field of Search ............... 71/32, 54, 61, 71/63, 11, 29, 30, 34

(56) References Cited

U.S. PATENT DOCUMENTS

| | | | |
|---|---|---|---|
| 2,756,134 | 7/1956 | Novak | 71/1 |
| 3,353,949 | 11/1967 | Nau | 71/64 |
| 3,640,698 | 2/1972 | Backlund | 71/29 |
| 3,753,722 | 8/1973 | Beucler | 99/2 |
| 3,846,290 | 11/1974 | Raymond | 210/11 |
| 4,033,745 | 7/1977 | Moore | 71/28 |
| 4,119,429 | 10/1978 | Lovness | 71/6 |
| 4,652,294 | 3/1987 | Arnold | 71/28 |
| 4,952,229 | 8/1990 | Muir | 71/7 |
| 5,549,729 | 8/1996 | Yamashita | 71/26 |
| 5,582,627 | 12/1996 | Yamashita | 71/26 |
| 5,597,400 * | 1/1997 | Nonomura et al. | 71/28 |
| 5,696,094 | 12/1997 | Yamashita | 514/22 |
| 5,797,976 * | 8/1998 | Yamashita et al. | 71/26 |
| 5,958,104 * | 9/1999 | Nonomura et al. | 71/11 |

FOREIGN PATENT DOCUMENTS

| | | |
|---|---|---|
| 52050879 | 4/1977 | (JP) . |
| WO 99/25191 | 5/1999 | (WO) . |

OTHER PUBLICATIONS

Product Label: "Nutri–Leaf Soluble Fertilizer; 20–20–20", Miller Chemical & Fertilizer Corporation (1991).
Product Label: "Sol–U–Gro; 12–48–8", Miller Chemical & Fertilizer Corporation (1991).
Product Label: "Crop Finisher 4–2–41", Miller Chemical & Fertilizer Corporation (1991).
Product Label: "Nutrichem 9–15–30", Miller Chemical & Fertilizer Corporation (1991).

* cited by examiner

*Primary Examiner*—Wayne Langel
(74) *Attorney, Agent, or Firm*—Howson and Howson

(57) ABSTRACT

A dry, concentrated, fertilizer which is readily water-soluble and a method of applying the solubilized dilute fertilizer to crops to enhance crop production are described. The dry fertilizer contains a contains nitrogen, phosphorus and potassium compounds, as well as a mixture of plant growth stimulators including at least one of each of growth promoters, vitamins, amino acids, carbohydrates/polysaccharides, and adjuvants.

24 Claims, No Drawings

SOLUBLE FERTILIZER FORMULATION

CROSS REFERENCE TO RELATED APPLICATIONS

This application claims benefit of US Provisional Application Ser. No. 60/129,902, filed Apr. 16, 1999, now abandoned.

FIELD OF THE INVENTION

The present invention relates generally to fertilizers for use in stimulating the health and growth of plants.

BACKGROUND OF THE INVENTION

Fertilizers are added to the soil or foliage of crops to supply elements needed for plant nutrition. Typically, nitrogen (N), phosphorus (P) and potassium (K) are the principal components of such fertilizers.

Fertilizer formulations and methods are the subject of on-going research, in order to improve the growth stimulating and stress tolerance effect on the plants. Additionally, there are on-going efforts to reduce the amount of fertilizer required for application to plants, in order to avoid leaching of nitrogen and phosphate into the groundwater.

Thus, there is a need for new methods of fertilizer application that supply nutrients in a readily available form and which can be applied as a foliar product.

SUMMARY OF THE INVENTION

The present invention provides a fertilizer which is readily water-soluble and particularly well adapted for foliar application.

In one aspect, the invention provides a dry concentrated fertilizer containing a nitrogen, phosphorous, and potassium compounds, micronutrients, and a growth enhancing mixture containing at least two or more components selected from among growth promoters, vitamins, amino acids, carbohydrates, polysaccharides, and adjuvants.

In another aspect, the invention provides a method of preparing a dry, water-soluble, fertilizer useful for foliar application. This method involves adding about 5% to about 10%, by weight, of a growth enhancing mixture to a base fertilizer mix comprising nitrogen, phosphorus and potassium compounds. The growth enhancing mixture contains at least two components selected from among growth promoters, vitamins; amino acids, carbohydrates, polysaccharides, and adjuvants.

In yet another aspect, the present invention provides a method of promoting crop production. This method involves placing concentrated fertilizer as described herein into a multiplicity spray tank and dissolving or diluting the fertilizer with water for application to crops.

Still other aspects and advantages of the invention will be readily apparent from the detailed description of the invention.

DETAILED DESCRIPTION OF THE INVENTION

This invention relates to a fertilizer which improves the effectiveness of various nutrient inputs and enhances the plant's ability to convert the input to a growth response. The invention further provides a method of adding various materials to a fertilizer to form a mixture that can be added to water when sprayed on the growing crops, thereby stimulating the crop growth response greater than conventional fertilizers. This method of the invention incorporates liquid and dry materials to a base fertilizer mix, as described below, in a manner which promotes solubility and the ability of the plant to better utilize the nutrients present in the fertilizer. In one desirable embodiment, the present invention provides a method for adding liquid to dry components to produce a dry fertilizer mix. Advantageously, the dry fertilizer mix of the invention is capable of handling more liquids than known dry fertilizers before experiencing the effects of hygroscopicity, i.e., clumping. In another embodiment, the invention provides a liquid fertilizer mix having significant advantages in growth enhancing and stress tolerance as compared to conventional fertilizers.

A. Composition of Fertilizer

Suitably, the present invention provides a novel mixture of growth enhancing components together with conventionally recognized macro nutrients (i.e., N, P, and K compounds), secondary nutrients (e.g., calcium (Ca), magnesium (Mg), sulfur (S)), and micro nutrients (e.g., boron (B), zinc (Zn), copper (Cu), and the like) where applicable. Suitable sources of these macro, secondary and micro nutrients will be readily apparent to those of skill in the art.

The growth enhancing mixture of the invention contains one or more vitamins and/or adjuvants and at least one other component selected from among growth promoters, amino acids, and carbohydrates, including, e.g., polysaccharides. Generally, the growth enhancing mixture comprises 5% to 10%, by weight, and more preferably, about 8%, by weight, of the dry concentrated fertilizer, with the remainder being composed of a mixture of macro, secondary, and micro nutrients. Advantageously, the precise amounts of each of the components of the growth enhancing mixture may be adjusted as needed or desired, taking into consideration the crops in to which they are to be applied, the soil type and conditions, among other factors. Preferably, at least one component from each of the above categories is included in the mixture.

Generally, vitamins are present in an amount of about 0.01% to about 10%, by weight, about 0.01% to 5%, and about 0.01% to about 3%, by weight of the total dry fertilizer composition. Suitable vitamins are readily selected from among niacin, d-Biotin, riboflavin, ascorbic acid, thiamine mononitrate, thiamine hygrochloride, pyridoxine hydrochloride, folic acid, derivatives of these vitamins, and mixtures thereof. These vitamins are preferably obtained in dry form as a pre-mixed package. Alternatively, the vitamins may be supplied individually or as other mixtures, which may be obtained from a variety of other sources. These sources include, without limitation, sources which are conventionally associated with sale of vitamins suitable for human consumption and/or formulation into human vitamins.

Growth promoters are present in an amount of about 0.0001 to about 1%, about 0.0001% to about 0.5%, and about 0.0001 to about 0.3%, by weight based on the total weight of the dry fertilizer composition. Desirably, these growth promoters and/or precursors thereof may be selected from among cytokinins, purines, gibberellins (including, without limitation, gibberellic acid), auxins, and mixtures thereof. Particularly suitable cytokinins include, without limitation, kinetin, zeatin, and the like. These growth promoters and precursors may be derived from natural sources or synthetic sources. These compounds are available commercially from a variety of sources.

Amino acids are present in an amount of about 0.01% to about 10%, by weight, about 0.01% to about 5%, and about 0.01 to about 3%, by weight of the total dry fertilizer composition. Useful amino acids include alanine, arginine, aspartic acid, betaines, choline, cysteine, glutamic acid, glycine, histidine, isoleucine, leucine, lysine, methionine, phenylalanine, proline, serine, threonine, tryptophan, tyrosine, valine, mixtures thereof, derivatives and metabolites of these amino acids, and mixtures thereof.

The growth promoters and amino acids may be obtained individually or as mixtures from a variety of sources which are known in the art. In a particularly desirable embodiment, the growth promoters and amino acids are supplied by seaweed extracts, which may be purchased from commercial sources.

Suitable carbohydrates and polysaccharides are selected from among alginic acid, mannitol, laminarin, succinic acid, sorbitol, fructose, sucrose, dextrose, lactose, derivatives thereof, and mixtures thereof. In one preferred embodiment, the polysaccharides are composed of a mixture of fructose and sucrose, most preferably, which are obtained in dry form. Suitably, the mixture may contain approximately equivalent amounts of the fructose and sucrose. Alternatively, the mixture may contain 55–90% fructose, with the remainder being sucrose. Still other mixtures may be readily selected. These carbohydrates and polysacchardes are present in a total amount of about 0.01% to about 10%, about 0.01 to about 5%, and about 0.01 to about 3%, by weight of the total dry fertilizer composition.

Adjuvants useful in the dry fertilizer of the invention include alcohol ether sulfates, alcohol sulfates, alkylaryl ether sulfates, alkylaryl sulfonates, carboxylated nonionics, naphthalene, sulfonates, phosphate esters, sulfonic acids, sulfosuccinates, terpenes, alcohol ethers, alkoxylated alkylphenol resins, alkoxylated vegetable oils, esterified seed oils, alkylphenol ethers, block co-polymers, sorbitol and sorbitan alkoxylates, sorbitol and sorbitan esters, alkanolamides, amine ethoxylates, methyl esters of fatty acids, ethyl esters of fatty acids, fatty acid alkyloxalates, and fatty acid resins. Currently, a particularly desirable adjuvant is a terpene. In one desirable embodiment, the terpene is a polymeric form of α- and β-pinene. These adjuvants are typically present in an amount which totals about 0.1 to about 10%, by weight, about 0.1 to about 5%, by weight, or about 0.1 to about 3%, by weight of the dry fertilizer composition. Advantageously, the adjuvants used in the composition of the invention increase uptake of the fertilizer by the plant to which it is delivered, thereby decreasing the amount of macro, micro, and secondary nutrients required.

Suitably, the dry fertilizer of the invention contains, in addition to the components of the growth stimulating mixture, macro nutrients including nitrogen, phosphorus, and potassium compounds. A variety of sources of these components are known. For example, suitable sources of nitrogen compounds include, urea, ammonium nitrate, ammonium phosphate, ammonium sulfate, urea phosphate, and ammonium molybdate, among others. Generally, the dry fertilizer of the invention contains about 10% to about 50%, about 15% to about 40%, or about 20% to about 30%, by weight, total nitrogen containing compounds. Potassium may be readily obtained from, for example, potassium nitrate, potassium hydroxide, potassium phosphate, potassium sulfate, or potassium chloride. Generally, potassium compounds total about 10% to about 80%, about 20% to about 60%, or about 30% to about 40%, by weight, of the total dry fertilizer of the invention. Depending upon the sources of potassium and/or nitrogen selected, the required amount of phosphorus for inclusion in the dry fertilizer of the invention may be provided in the form of a potassium phosphate or an ammonium phosphate. However, where desired, other sources of phosphorus may be utilized. Such sources may include, e.g., phosphorous acids and salts thereof, e.g., phosphite. Typically, the dry fertilizer contains about 10% to about 80%, by weight, about 20% to about 60%, or about 30% to about 50%, by weight, total phosphorus-containing compounds.

A variety of sources of conventional secondary and micro nutrients are known. These micronutrients include, for example, magnesium sulfate, calcium nitrate, sodium borate, magnesium nitrate, chelated complexes of copper, calcium, iron, zinc, magnesium, manganese, ammonium or sodium molybdate, and mixtures thereof. Suitably, the total amount of these micronutrients totals about 1% to about 3%, by weight, of the total dry fertilizer of the invention, and most preferably, about 2%, by weight, of the total dry fertilizer.

In addition to the desired nutrients, other additives known in the fertilizer industry can be added. These include, benzoic acids and derivatives thereof, salicylic acid and derivatives thereof, including, e.g., acetylsalicylic acid. Other additives may include, e.g., wetting-agents, surfactants, spreaders, stickers and the like. Still other suitable additives may be readily selected by one of skill in the art.

The components of the growth stimulating mixture may be separately mixed, and added to a base composed of a previously formulated fertilizer. Alternatively, the components of the growth stimulating mixture may be added during the preparation of the fertilizer composition of the invention, as described below.

B. Formulation of Fertilizer

The present invention provides in a single dry source, all components required to stimulate plant growth. The fertilizer formulation of the invention provides significant convenience, insofar as it avoids the need to mix dry and liquid nutrients and other additives at the time of application.

Thus, the invention provides a method of preparing a dry, water-soluble, fertilizer useful for foliar application. In one desirable embodiment, the dry components, selected from among those described above, go through a grinding unit and a mixer (typically, 2000 lb batches are prepared) is charged with the dry ingredients. The liquid components, e.g., the adjuvant, are injected or sprayed into the mixer and blended until a substantially homogenous dry mixture is achieved. Generally, a suitably mixed blend is obtained in about 5 to about 15 minutes. However, mixing times may be adjusted as necessary for convenience.

While not wishing to be bound by theory, it is believed that the dry polysaccharides (or other carbohydrates) are the component(s) which facilitate the preparation of these dry fertilizer mixtures of the invention. Advantageously, these fertilizer mixtures are capable of remaining in dry form without clumping upon exposure to higher moisture levels than conventional dry fertilizer mixtures. More specifically, it is believed that the polysaccharides and/or other carbohydrates absorb the moisture associated with the liquid components and form a matrix. Thus, it is preferred that the polysaccharide and carbohydrate components be in dry form when added to the mixer. Preferably the vitamins are also provided in dry form. However, as these dry vitamin preparations tend to be hygroscopic, it may be necessary to dissolve any clumps in water and to spray the vitamins in liquid form into the mixer. Most preferably, the growth promoters and amino acids are provided by seaweed extracts which are purchased in dry or liquid forms.

Although not as desirable, other methods for mixing the components of the fertilizer of the invention will be readily apparent to one of skill in the art. Alternatively, the fertilizer described herein may be prepared as a liquid concentrate using conventional techniques.

C. Application of Fertilizer

The fertilizer of the invention is particularly well suited to foliar application but is readily adapted for application by other methods, including, irrigation and soil. Typically, prior to application, the dry fertilizer of the invention is dissolved (or diluted) in water at a ratio of about 1 part fertilizer to about 4 to about 600 parts water, or more. Generally, for foliar application, the fertilizer is administered in an amount ranging from about 3 to about 10 pounds per acre, and most preferably about 5 pounds per acre.

The fertilizer is applied according to crop-specific recommendations which will depend upon the application method, time of application, rate of application, and product formulation. Crops that will benefit from the fertilizer include, but are not limited to, fruit, nuts, citrus, watermelon, tomatoes, peppers, cucumbers, row crops such as cotton, corn and wheat, as well as other edible, commercial and ornamental plants.

grinding the dry ingredients and then blending in a mixer charged with all ingredients, as described above. With respect to the components of the growth enhancing mixture, the growth promoters and amino acids were obtained from seaweed extracts. The vitamin mix, carbohydrate mix and terpene adjuvant were obtained from commercial sources. The micronutrients used in these formulations include boron (0.02%), copper (0.05%), iron (0.1%), manganese (0.05%), molybdenum (0.001%), and zinc (0.05%). In certain of the other fertilizers, the micronutrients also included magnesium, which is typically present in an amount of 0.5%. This percentage, as well as the percentages identified above, are based upon the total weight of the fertilizer mixture. After mixing of the dry components, which included the carbohydrate, the liquid components were sprayed directly into the mixer and then blended for about 15 minutes.

Field Test Product Formulae

|  | Nutri Leaf 20-20-20 | Sol-U-Gro 12-48-8 | Crop Finisher 4-2-41 | Nutri Chem 9-15-30 | Nutrient Express 18-18-18 | Nutrient Express 4-41-27 |
|---|---|---|---|---|---|---|
| Potassium Nitrate | 40.50% | 10.00% | 29.96% | 45.50% | 40.00% |  |
| Monoammonium Phosphate | 15.00% | 71.35% |  |  | 20.00% |  |
| Diammonium Phosphate | 17.50% |  |  |  | 12.50% |  |
| Urea | 20.00% |  |  |  | 17.50% | 10.00% |
| Monopotassium Phosphate | 5.00% | 10.00% | 4.99% | 30.0% |  | 80.00% |
| Ammonium Nitrate |  | 6.65% |  |  |  |  |
| Potassium Sulfate |  |  | 52.92% |  |  |  |
| Ammonium Sulfate |  |  |  | 22.05% |  |  |
| Magnesium Chelate |  |  |  | 0.45% |  |  |
| Magnesium Sulfate |  |  | 10.13% |  |  |  |
| Micronutrients | 2.00% | 2.00% | 2.00% | 2.00% | 2.00% | 2.00% |
| Growth enhancing mixture |  |  |  |  | 8.00% | 8.00% |
| Total | 100.00% | 100.00% | 100.00% | 100.00% | 100.00% | 100.00% |

In one currently preferred embodiment, the fertilizer of the invention is applied through the use of a multiplicity spray tank. However, other methods for delivery of the fertilizer will be readily apparent to those of skill in the art.

The following examples illustrate the effect of two exemplary fertilizers according to the present invention on crop production, in comparison to standard fertilizer programs. These examples are not a limitation on the present invention.

Example 1

Preparation of Exemplary Fertilzers

The following fertilizers were prepared for use in the field trials described below. All fertilizers are commercially available, with the exception of Nutrient Express 18-18-18 and Nutrient Express 4-41-27, which were prepared in accordance with the present invention. Nutrient Express®, NutriLeaf®, Sol-U-Gro®, Crop Finisher™ and Nutri-Chem™ are trademarks for crop fertilizers owned by Miller Chemical & Fertilizer Corporation, Hanover Pa.

The Nutrient Express 18-18-18 or 4-41-27 formulations were prepared using the components identified below, by Example 2

Field Trial—Watermelons

Location: Metler, Calif.

Crop: Watermelons Tri X313

Treatment 1: Nutrient Express 4-41-27—5 lbs./A.—May 15

Nutrient Express 4-41-27—5 lbs./A.—June 1

Nutrient Express 18-18-18—5 lbs./A.—June 15

Nutrient Express 18-18-18—5 lbs./A.—July 1

Nutrient Express 18-18-18—5 lbs./A.—July 15

Treatment 2: For purposes of comparison, Sol-U-Gro 12-48-8 was applied at the same rates and application times as described above for Nutrient Express 4-41-27. Similarly, Nutri Leaf 20-20-20 was applied using the same rates and application times as described for Nutrient Express 18-18-18.

Two pickings of the fertilized crops were made. The total yield, provides in tons per acre (T/A) was as follows.

|                  | Picking 1 | Picking 2 | Total   |
|------------------|-----------|-----------|---------|
| Nutrient Express | 53 T/A    | 15 T/A    | 68 T/A  |
| Standard         | 35 T/A    | 18 T/A    | 53 T/A  |

The Nutrient Express program increases yields by 15 tons per acre or 28% improvement over the Standard program.

Example 3

Tomatoes

Location: Metler, Calif.

Crop: Tomatoes (Processing)

The following treatments were applied by spraying, at the rates and times listed below.

Treatment 1: Nutrient Express 4-41-27—5 lbs./A.—May 15

Nutrient Express 4-41-27—5 lbs./A.—June 1

Nutrient Express 18-18-18—5 lbs./A.—June 15

Nutrient Express 18-18-18—5 lbs./A.—July 1

Nutrient Express 18-18-18—5 lbs./A.—July 15

Treatment 2: As a control, a standard fertilizer program, as described in Example 2, was used.

The crop was mechanically harvested one time. The Nutrient Express program yielded 51 tons per acre while the Standard program yielded 39 tons per acre. The Nutrient Express program increases yields 12 tons per acre or 31% over the Standard program.

Example 4

Peppers

Location: Metler, Calif.

Crop: Hot Yellow Peppers (Santa Fe)

The following treatments were applied by spraying, at the rates and times listed below.

Treatment 1: Nutrient Express 4-41-27—5 lbs./A.—May 15

Nutrient Express 4-41-27—5 lbs./A.—June 1

Nutrient Express 18-18-18—5 lbs./A.—June 15

Nutrient Express 18-18-18—5 lbs./A.—July 1

Nutrient Express 18-18-18—5 lbs./A.—July 15

Treatment 2: A Standard Fertilizer program, as described in Example 2, was used as a control and for comparison.

The peppers from both treatment programs were picked three times. The Nutrient Express program yielded 19 tons per acre, while the Standard program yielded 15 tons per are. The Nutrient Express program increased 4 tons per acre or 27% over the Standard program.

Example 5

Cucumbers

Location: Eastern Shore, Va.

Crop: Cucumbers (Speedway)

The following treatments were applied by spraying, at the rates and times listed below.

Treatment 1: Nutrient Express 18-18-18—5 lb./A.—3 to 5 leaf stage

Nutrient Express 18-18-18—5 lb./A.—10 to 14 days later

Nutrient Express 18-18-18—5 lb./A.—10 to 14 days later

Nutrient Express 4-41-27—5 lb./A.—directly after $1^{st}$ pick

Nutrient Express 4-41-27—5 lb./A.—7 days after $1^{st}$ picking

Treatment 2: For comparison, the following standard fertilizer program was followed using the same rates and application times as described for Treatment 1 of this example.

Nutri-Leaf 20-20-20—5 lb./A.—3 to 5 leaf stage

Nutri-Leaf 20-20-20—5 lb./A.—10 to 14 days later

Nutri-Leaf 20-20-20—5 lb./A.—10 to 14 days later

Nutri-Chem 9-15-30—5 lb./A.—directly after $1^{st}$ pick

Nutri-Chem 9-15-30—5 lb./A.—7 days after $1^{st}$ picking

Results:

|                                          | % Yield  |          |          | Fancy Yield   | Total Yield   |
|------------------------------------------|----------|----------|----------|---------------|---------------|
| Treatment                                | $1^{st}$ Pick | $2^{nd}$ Pick | $3^{rd}$ Pick | Bushels/Acre  | Bushels/Acre  |
| Nutrient Express (Treatment I)           | 20       | 47       | 34       | 349.6 (76%)   | 460           |
| Standard Program (Treatment II)          | 17       | 42       | 36       | 306 (73%)     | 328           |

Treatment I (Nutrient Express) was the highest yielder of fancy fruit and total yield when compared to the Standard program.

Example 6

Cotton

Location: Clarksdale, Miss.

Crop: Cotton

The following treatments were applied by spraying, at the rates and times listed below.

Treatment 1: Nutrient Express 18-18-18—5 lb./A.—4 leaf stage

Nutrient Express 18-18-18—5 lb./A.—Pin Head Square

Nutrient Express 11-41-8—5 lb./A.—First Flower

Nutrient Express 11-41-8—5 lb./A.—Two weeks later

Crop Finisher 4-2-41—5 lb./A.—Four weeks later

Treatment 2: For comparison, the following standard fertilizer program was followed using the same rates and application times as described for Treatment 1 of this example.

Nutri-Leaf 20-20-20—5 lb./A.—4 leaf stage

Nutri-Leaf 20-20-20—5 lb./A.—Pin Head Square

Sol-U-Gro 12-48-8—5 lb./A.—First Flower

Sol-U-Gro 12-48-8—5 lb./A.—Two weeks later

Crop Finisher 4-2-41—5 lb./A.—Four weeks later

The Nutrient Express program yielded 1,263 lbs. per acre of short staple lint while the Standard program yielded 884 lbs. per acre. The Nutrient Express program yielded 379 lbs. per acre of lint more than the Standard program for a 43% increase in lint weight per acre.

Example 7

Cucumbers

Location: Marathona, Greece

Crop: Cucumbers (Dinado)

The following treatments were applied by spraying, at the rates and times listed below.

Treatment 1: Nutrient Express 18-18-18—5 lb./A.—Sept. 10

Nutrient Express 18-18-18—5 lb./A.—Sept. 20
Nutrient Express 18-18-18—5 lb./A.—Sept. 30
Nutrient Express 18-18-18—5 lb./A.—Oct. 14
Nutrient Express 18-18-18—5 lb./A.—Oct. 31

Treatment 2: For comparison, the following standard fertilizer programs were followed using the same rates and application times as described for Treatment 1 of this example.

29-0-0—2 qt./A.—Sept. 10
0-17-22—3 qt./A.—Sept. 20
0-17-22—3 qt./A.—Sept. 30
13-0-46—4 lb./A.—Oct. 14
13-0-46—4 lb./A.—Oct. 31

Cucumbers were picked 16 times with total yield as indicated.

|  | Yield |
| --- | --- |
| Nutrient Express | 58,400 (+15.4%) |
| Standard program | 49,400 lbs. |

Nutrient Express improved crop production by 15.4% over the Standard nutritional program.

All publications cited in this specification are incorporated herein by reference herein. While the invention has been described with reference to a particularly preferred embodiment, it will be appreciated that modifications can be made without departing from the spirit of the invention. Such modifications are intended to fall within the scope of the appended claims.

What is claimed is:

1. A dry concentrated fertilizer comprising about 10% to about 50% by weight of nitrogen compounds, about 10% to about 80% by weight of phosphorus compounds, and about 10% to about 80% by weight of potassium compounds, secondary nutrients, micronutrients, and about 5% to about 10% by weight of a growth enhancing mixture,
   wherein said growth enhancing mixture comprises vitamins, and at least one component selected from the group consisting of growth promoters, amino acids, carbohydrates, polysaccharides, and adjuvants.

2. The dry concentrated fertilizer according to claim 1, wherein the growth enhancing mixture comprises about 8%, by weight, of the concentrated fertilizer.

3. The dry fertilizer according to claim 1, wherein the growth promoters are selected from the group consisting of: cytokinins, purines, gibberellins, and auxins.

4. The dry fertilizer according to claim 1, wherein the vitamins are selected from the group consisting of niacin, d-Biotin, riboflavin, ascorbic acid, thiamine mononitrate, thiamine hygrochloride, pyridoxine hydrochloride, and folic acid.

5. The dry fertilizer according to claim 1, wherein the amino acids are selected from the group consisting of: alanine, arginine, aspartic acid, betaines, choline, cysteine, glutamic acid, glycine, histidine, isoleucine, leucine, lysine, methionine, phenylalanine, proline, serine, threonine, tryptophan, tyrosine, and valine.

6. The dry fertilizer according to claim 1, wherein the carbohydrates and polysaccharides are selected from the group consisting of alginic acid, mannitol, laminarin, succinic acid, sorbitol, fructose, sucrose, dextrose, lactose, and mixtures thereof.

7. The dry fertilizer according to claim 6, wherein the carbohydrates consist of a mixture of fructose and sucrose.

8. The dry fertilizer according to claim 1, wherein the adjuvant is selected from the group consisting of alcohol ether sulfates, alcohol sulfates, or alkyl or aryl ether sulfates, alkylaryl sulfonates, carboxylated nonionics, naphtalene, sulfonates, phosphate esters, sulfonic acids, sulfosuccinates, terpenes, alcohol ethers, alkoxylated alkylphenol resins, alkoxylated vegetable oils, esterified seed oils, alkylphenol ethers, block co-polymers, sorbitol and sorbitan alkoxylates, alkanolamides, amine ethoxylates, methyl esters of fatty acids, ethyl esters of fatty acids, fatty acid alkyloxalates, and fatty acid resins.

9. The dry fertilizer according to claim 1, comprising about 40% to about 80%, by weight, of a potassium salt.

10. The dry fertilizer according to claim 9, wherein the potassium salt is at least on member selected from the group consisting of potassium hydroxide, potassium nitrate, potassium phosphate, potassium sulfate, and potassium chloride.

11. The dry fertilizer according to claim 1, wherein the nitrogen compounds are at least one member selected from the group consisting of ammonium phosphate, ammonium sulfate, urea phosphate, and ammonium molybdate.

12. The dry fertilizer according to claim 1, comprising about 10% to about 50%, by weight, of a phosphorus compound.

13. The dry fertilizer according to claim 1, wherein the phosphorus compounds are selected from the group consisting of a potassium phosphate, an ammonium phosphate, and phosphorous acids and salts thereof.

14. The dry fertilizer according to claim 1, further comprising one or more micronutrients selected from the group consisting of: magnesium sulfate, calcium nitrate, magnesium nitrate, chelated complex of copper, calcium, iron, zinc, magnesium, manganese, sodium borate, and ammonium or sodium molybdate.

15. The dry fertilizer according to claim 14, comprising about 2%, by weight, of one or more micronutrients.

16. The fertilizer according to claim 1, wherein said growth enhancing mixture further comprises salicylic acid and derivatives thereof.

17. The fertilizer according to claim 1, wherein said growth enhancing mixture further comprises benzoic acid and derivatives thereof.

18. A method of promoting crop production, said method comprising the steps of:
   placing dry concentrated fertilizer according to claim 1 into a multiplicity spray tank and dissolving the fertilizer with water to obtain liquid fertilizer mixture; and
   spraying crops with the liquid fertilizer mixture.

19. The method according to claim 18, wherein the dry fertilizer is dissolved with water at a ratio of about 1 part fertilizer to about 4 to about 600 parts water.

20. A method of preparing a dry, water-soluble, fertilizer useful for foliar application, said method comprising the steps of:
   adding about 5% to about 10% by weight of a growth enhancing mixture to a dry base fertilizer mix comprising about 10% to about 50% by weight of nitrogen compounds, about 10% to about 80% by weight of phosphorus compounds and about 10% to about 80% by weight of potassium compounds, wherein said growth enhancing mixture comprises vitamins, and at least one component selected from the group consisting of growth promoters, amino acids, carbohydrates, polysaccharides, and adjuvants.

21. A dry concentrated fertilizer comprising about 10% by weight of urea, about 80% by weight of monopotassium phosphate, about 2% by weight of micronutrients, and about 8% by weight of a growth enhancing mixture,
   wherein said growth enhancing mixture comprises vitamins, and at least one component selected from the group consisting of growth promoters, amino acids, carbohydrates, polysaccharides, and adjuvants.

22. A dry concentrated fertilizer comprising about 40% by weight of potassium nitrate, about 20% by weight of monoammonium phosphate, about 12.50% by weight of diammonium phosphate, about 17.50% by weight of urea, about 2% by weight of micronutrients, and about 8% by weight of a growth enhancing mixture,
   wherein said growth enhancing mixture comprises vitamins, and at least one component selected from the group consisting of growth promoters, amino acids, carbohydrates, polysaccharides, and adjuvants.

23. A dry concentrated fertilizer consisting of potassium nitrate, monoammonium phosphate, about 2% by weight of micronutrients, and about 8% by weight of a growth enhancing mixture,
   wherein said growth enhancing mixture comprises vitamins, and at least one component selected from the group consisting of growth promoters, amino acids, carbohydrates, polysaccharides, and adjuvants.

24. A dry concentrated fertilizer comprising about 30% by weight of potassium nitrate, about 20% by weight of monoammonium phosphate, about 40% by weight of potassium sulfate, about 2% by weight of micronutrients, and about 8% by weight of a growth enhancing mixture,
   wherein said growth enhancing mixture comprises vitamins, and at least one component selected from the group consisting of growth promoters, amino acids, carbohydrates, polysaccharides, and adjuvants.

* * * * *